United States Patent [19]

Moyle

[11] Patent Number: 5,172,770
[45] Date of Patent: Dec. 22, 1992

[54] AGRICULTURAL SHARES WITH DIMPLES

[75] Inventor: Raymond G. B. Moyle, Beechboro, Australia

[73] Assignees: Clarewood Pty Ltd; Wundowie Foundry Pty Ltd, Wundowie, Australia

[21] Appl. No.: 673,641

[22] Filed: Mar. 22, 1991

[30] Foreign Application Priority Data

Mar. 22, 1990 [AU] Australia ................ PJ9257

[51] Int. Cl.$^5$ .............................................. A01B 3/00
[52] U.S. Cl. ...................... 172/732; 172/721; 172/724; 172/730; 172/765
[58] Field of Search ............... 172/721-732, 172/765

[56] References Cited

U.S. PATENT DOCUMENTS

| 92,880 | 7/1869 | Pratt | 172/721 |
|---|---|---|---|
| 1,422,418 | 7/1922 | Colby | 172/765 |
| 4,059,161 | 11/1977 | Smith et al. | 172/747 |
| 4,911,249 | 3/1990 | Mitchell | 172/719 |

FOREIGN PATENT DOCUMENTS

| 2538 | 6/1926 | Australia | 172/730 |
|---|---|---|---|
| 39203 | 8/1928 | Denmark | 172/730 |
| 1063300 | 12/1983 | U.S.S.R. | 172/730 |
| 1493122 | 7/1989 | U.S.S.R. | 172/724 |
| 533554 | 2/1941 | United Kingdom | 172/730 |

Primary Examiner—Randolph A. Reese
Assistant Examiner—Timothy Aberle
Attorney, Agent, or Firm—Harness, Dickey & Pierce

[57] ABSTRACT

An agricultural share having a working portion with a front face, a rear face and two sides converging to a forward point. A plurality of depressions are formed on the rear face of the working portion in the vicinity of the two sides for the purpose of achieving a reduction in the "footprint" area of the share. Additionally, the depressions serve to trap soil therein with the result that there is a reduction in wear on the rear face.

9 Claims, 4 Drawing Sheets

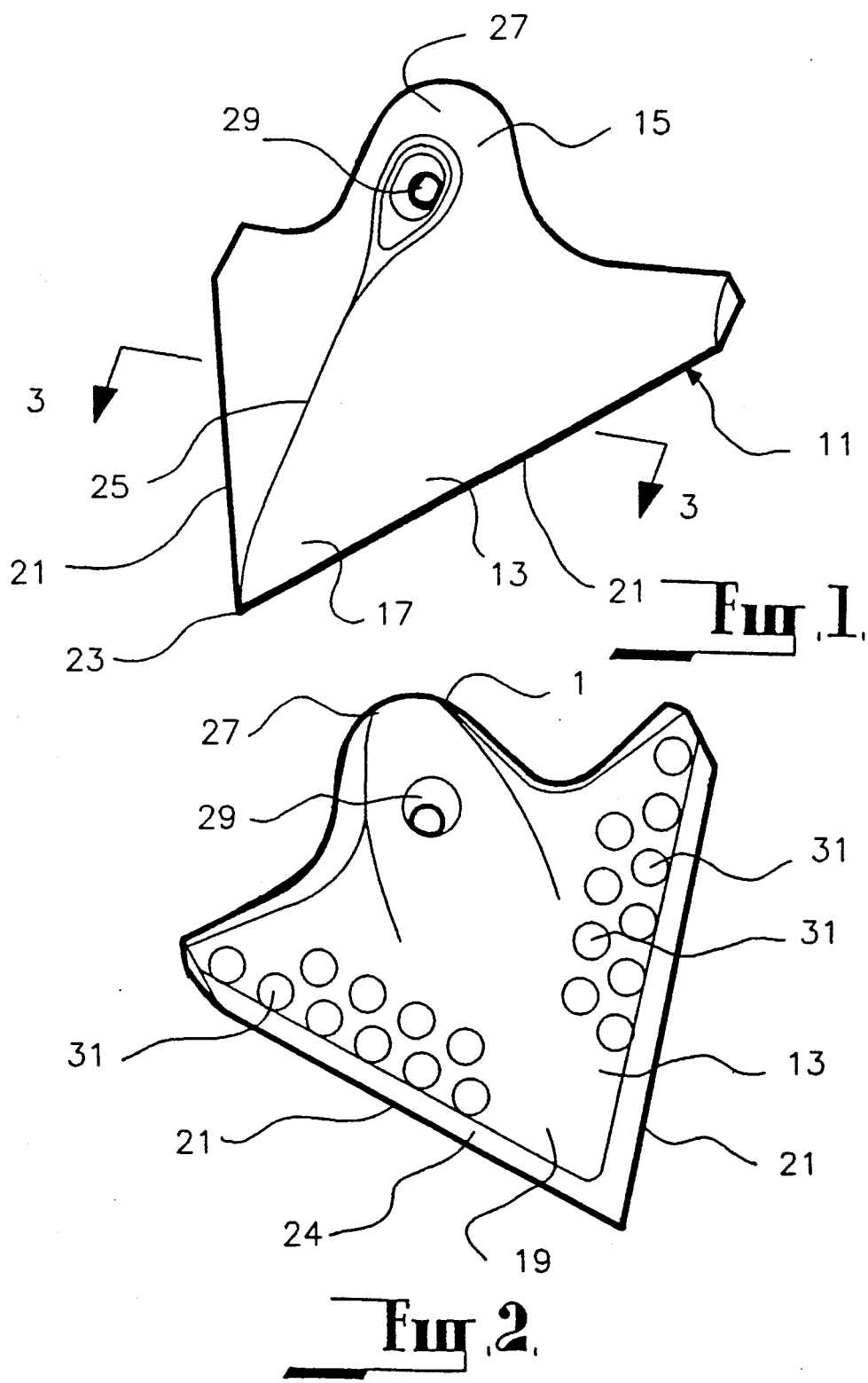

AGRICULTURAL SHARES WITH DIMPLES

BACKGROUND OF THE INVENTION

This invention relates to agricultural shares for agricultural machines such as seeding combines, scarifiers and cultivators.

Agricultural shares generally comprise a working portion which is intended for engagement with the ground and which has a front face, a rear face and two sides converging to a forward point. There is generally a land portion extending between the front and rear faces at the two sides of the share. The land portion defines the lower contact plane of the share with the ground and forms the footprint area of the share.

With agriculture shares, there is a direct relationship between the footprint area of the share and the resistance to both draft and ground penetration. Accordingly, resistance to both draft and ground penetration can be reduced if footprint area is reduced.

The present invention seeks to provide a novel and useful agricultural share which has provision to achieve a reduction in footprint area.

SUMMARY OF THE INVENTION

In one form the invention resides in an agricultural share comprising a working portion for engaging the ground, said working portion having a front face, a rear face and two sides converging to a forward point, and a plurality of depressions formed on said rear face.

Preferably, the depressions are in the form of dimples. Preferably at least some of the depressions are arranged in two rows, each row extending generally parallel to one of the two sides.

There may be further rows of depressions. The depressions in such further rows are preferably offset from depressions in the first-mentioned rows.

The depressions can serve to reduce the footprint area of the share once the sides of the share have receded to the depressions as a result of wear, particularly in cases where the depressions are in rows extending generally parallel to the sides of the share.

A reduction in footprint area is significant owing to the fact that resistance to both draft and ground penetration is increased with footprint area. Energy savings are therefore available if the footprint area is reduced so as to produce a reduction in resistance to both draft and ground penetration.

Additionally, once each side has receded to the depressions as a result of wear, the side becomes somewhat irregular with the result that it becomes more effective in severing woody plants which might have otherwise been inclined to slip along the leading side as the agricultural share advanced through the ground.

In another arrangement, the depressions may accommodate elements of wear resistant material such as tungsten carbide or wear resistant ceramics.

BRIEF DESCRIPTION OF THE DRAWINGS

The invention will be better understood by reference to the following description of several specific embodiments thereof as shown in the accompanying drawings in which:

FIG. 1 is a perspective view from above and one side of a tillage point according to a first embodiment in an unworn condition, the tillage point being in an unworn condition;

FIG. 2 is an underside view of the tillage point of FIG. 1;

DESCRIPTION OF PREFERRED EMBODIMENT

Figure 3:
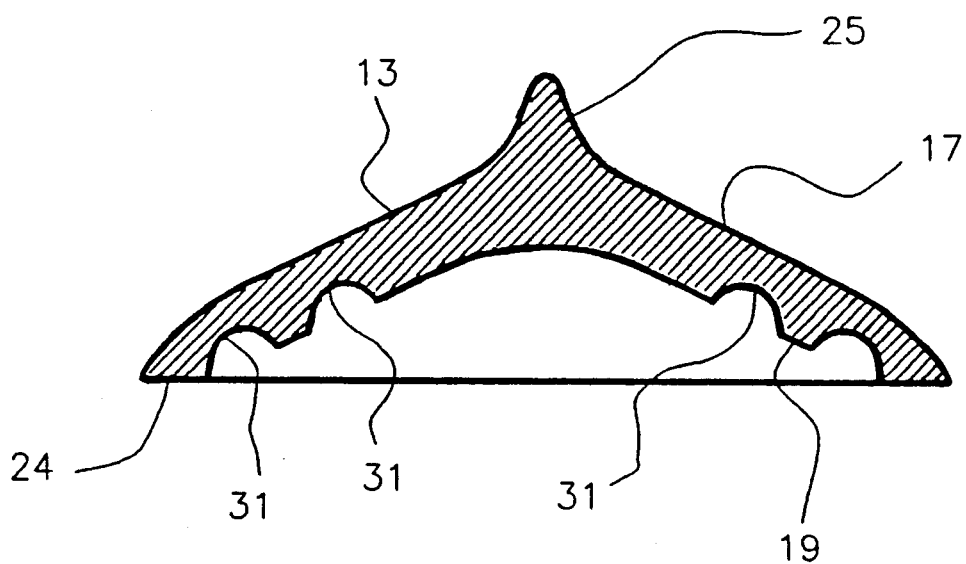
FIG. 3 is a cross-sectional view taken along the line 3—3 of FIG. 1.
Figure 4:
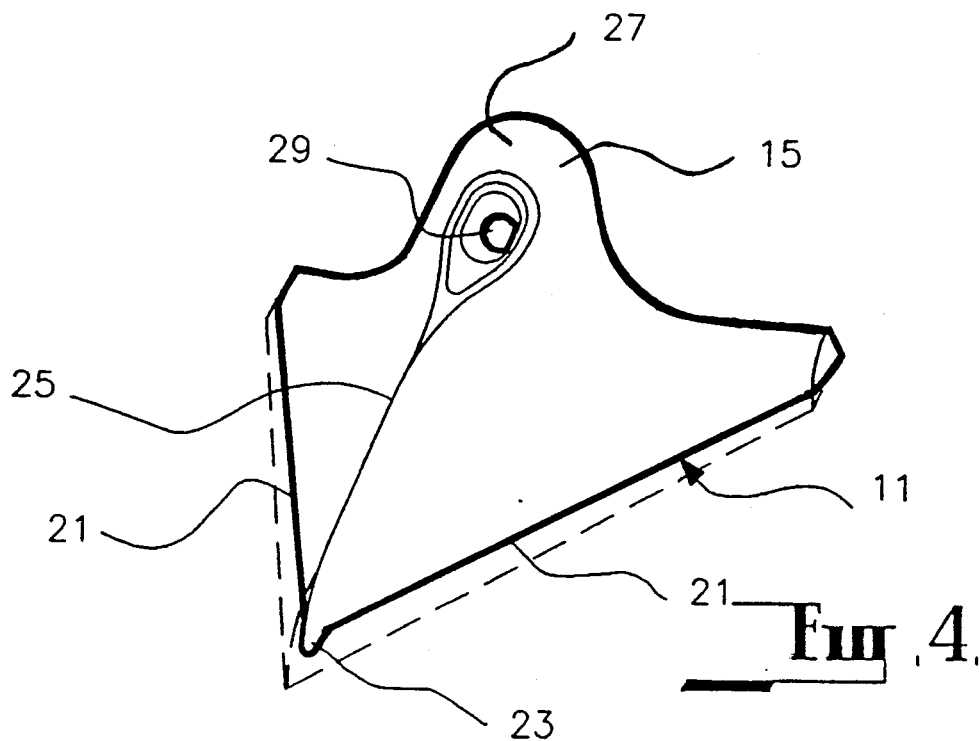
FIG. 4 is a view similar to FIG. 1 with the exception that the tillage point is shown in a partly worn condition and with broken lines indicating the original unworn condition of the share for reference purposes.

The embodiments shown in the drawings are directed to agricultural shares in the form of tillage points formed of cast material.

The tillage point according to the embodiment comprises a body 11 having a working portion 13 and a mounting portion 15. The working portion 13 comprises a front face 17, a rear face 19, and a pair of leading sides 21 which converge to a forward point at nose 23. A land portion 24 extends between the front and rear faces at the two sides of the tillage point. The land area 24 defines the footprint area of the tillage point. A reinforcing rib 25 is centrally mounted on the front face 17 and extends from the mounting portion 15 to the nose 23.

The mounting portion 15 comprises a mounting shank 27 of conventional form and a mounting aperture 29 provided in the mounting shank.

A plurality of depressions 31 in the form of dimples are provided on the rear face 19 of the working portion, inwardly of the land portion 24 when the tillage point is in an unworn condition. The dimples 31 are arranged in rows, each extending generally parallel to a respective one of the leading sides 21. In this embodiment, there are two such rows and the dimples in the one row are offset with respect to the dimples in the other row, as best shown in FIG. 2 of the drawings. Additionally, in this embodiment, each row of dimples is parallel to the respective leading side but in other embodiment the rows may be slightly inclined to the respective sides. In such cases the inclination would preferably be such that the rows diverge from the respective sides in the forward direction when the point is in an unworn condition. The purpose of the inclination is to accommodate a greater rate of wear at the forward part of the tillage point.

The dimples 31 define cavities (as best seen in FIG. 3) in which soil can be trapped as the tillage point advances through the ground. The soil trapped in the dimples becomes packed and so serves to offer the body of the tillage point some protection against the wearing effects of oncoming soil at least in the vicinity of the dimples. Apart from increasing the operating life of the point, this produces a further benefit is that it leads to the formation of a sharper cutting edge at the front of the land portion 24. This is because the region of the front face 17 adjacent the cutting edge wears at a faster rate than the corresponding region of the rear face.

Figure 5:
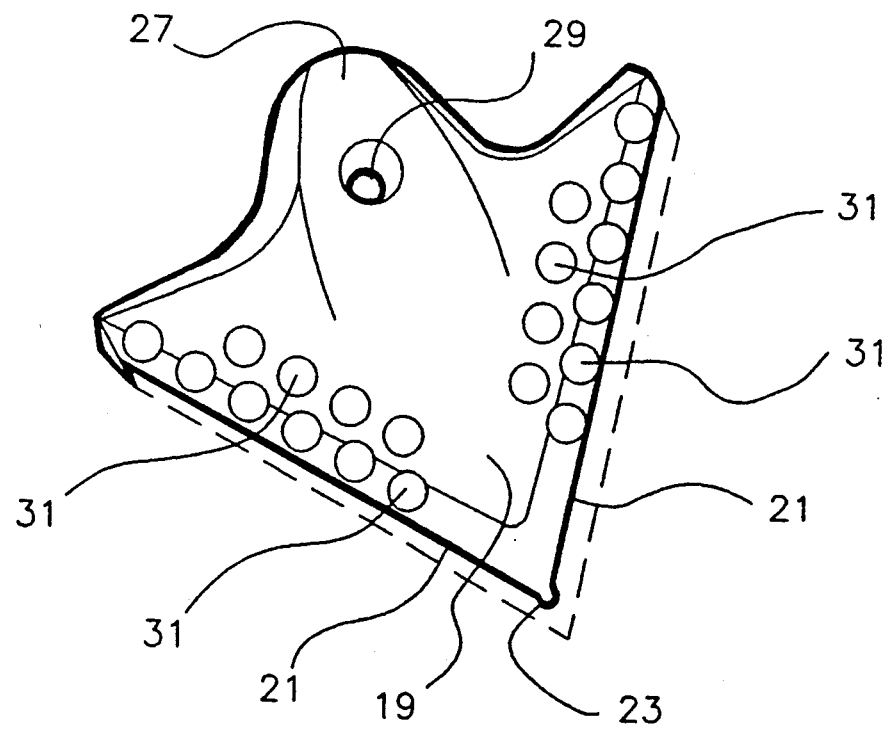
FIG. 5 is an underside view of the tillage point of FIG. 4.
Figure 7:
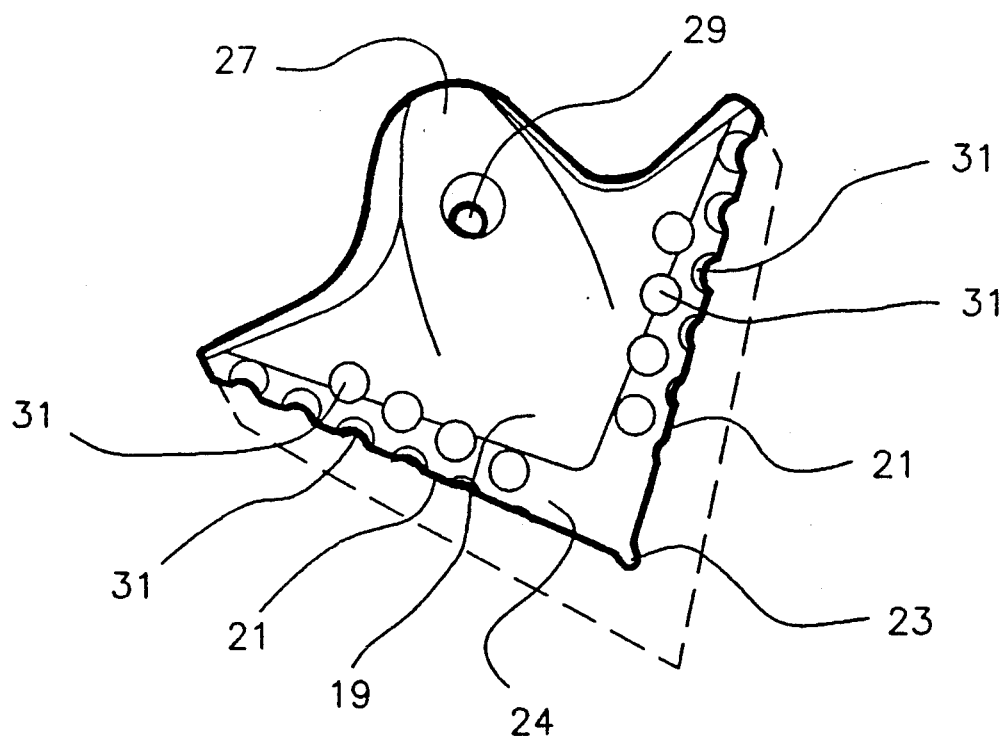
FIG. 7 is an underside view of the tillage point of FIG. 6.

As the leading sides 21 recede through wear, the land portion 24 approaches and eventually merges with the dimples 31. This results in the dimples 31 being present on the land portion 24, as shown in FIGS. 5 and 7. The presence of the dimples on the land portion 24 reduces the footprint area defined by the land portion with the result that resistance to both draft and ground penetration is reduced. This provides for energy savings in operating agricultural machinery employing the tillage point.

Figure 6:
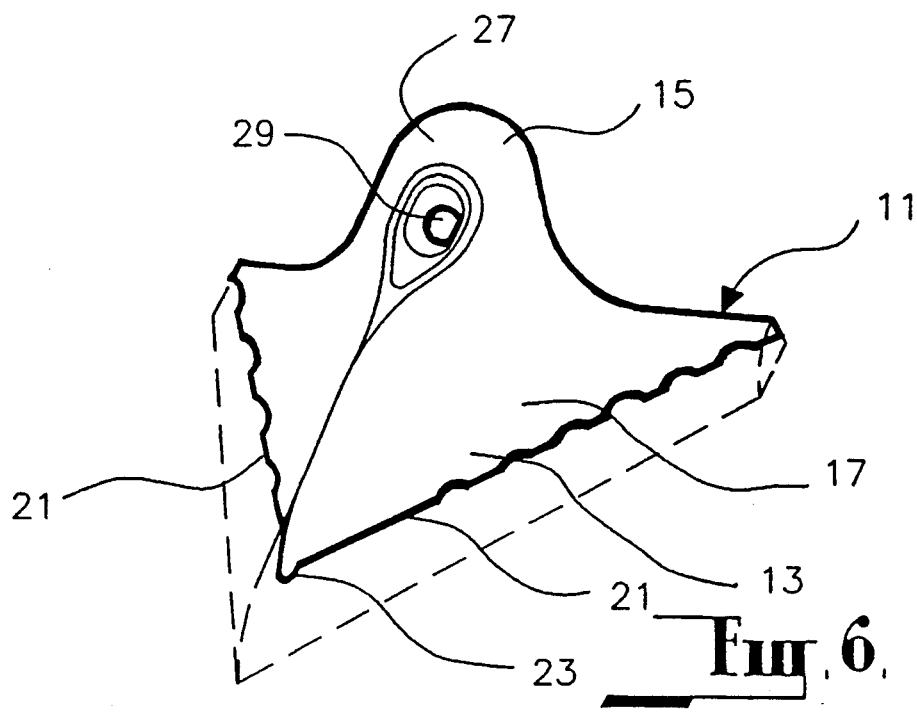
FIG. 6 is a view similar to FIG. 4 with the exception that the tillage point is shown a condition where further wear has occurred.

As the leading edges 21 continue to recede they eventually merge with the rows of dimples with the result that the leading sides develop an irregular edge, as shown in FIGS. 6 and 7. This irregular edge at each leading side is beneficial in that it serves to sever woody plant material which might otherwise slide along the leading side as the tillage point advances through the soil.

From the foregoing it is evident that tillage points according to the embodiment have the benefit of both lower resistance to both draft and ground penetration and increased operating life.

There may be situations where it is desirable to bond elements of wear resistant material into the dimples, particularly where the tillage point is to be used in soil types which are not conducive to accumulation and packing of soil in the dimples. The wear resistant elements may be of any suitable material such as tungsten carbide or wear resistant ceramics.

While the embodiment has been described in relation to cast tillage points, it should be understood that the invention may be applied to other agricultural shares such as pressed metal tillage points.

Finally, it should be appreciated that various other modifications and changes may be made to the embodiment without departing from the scope of the invention. The claims defining the invention are as follows:

I claim:

1. An agricultural share comprising a working portion, said working portion having a front face, a rear face and two sides converging to a forward point, said rear face having ground engaging portions extending along said sides and adapted to rest upon the ground before said working portion penetrates the ground, and a plurality of surface discontinuities in the form of dimples formed in a row along the ground engaging portion said sides of said rear face for providing areas of different thicknesses between said front face and said rear face from the front to the rear of said working portion for reducing the surface area of contact between said portions and the ground as said working portion wears.

2. An agricultural share according to claim 1 wherein at least some of the dimples are arranged in two rows, each row extending from the front to the rear of the said working portion.

3. An agricultural share according to claim 2 wherein there are further rows of dimples.

4. An agricultural share according to claim 3 wherein dimples in any one row are offset from depressions in an immediately adjacent row.

5. An agricultural share according to claim 1 wherein said dimples are disposed adjacent said two sides of said working portion.

6. An agricultural share according to claim 1 wherein the dimples receive elements of wear resistant material.

7. An agricultural share according to claim 1 wherein soil may pack into the dimples as the working portion passes through the ground.

8. An agricultural share according to claim 2 wherein the rows extend generally parallel to the sides.

9. An agricultural share according to claim 2 wherein the rows are inclined to the sides so as to diverge from the respective sides in the forward direction when the working portion is unworn.

* * * * *